United States Patent
Paravada et al.

(10) Patent No.: US 12,423,252 B2
(45) Date of Patent: Sep. 23, 2025

(54) SYSTEMS AND METHODS FOR REDUCING LATENCY AND IMPROVING PERFORMANCE IN A PERIPHERAL COMPONENT INTERCONNECT EXPRESS (PCIe) SYSTEM

(71) Applicant: QUALCOMM INCORPORATED, San Diego, CA (US)

(72) Inventors: Surendra Paravada, Hyderabad (IN); Madhu Yashwanth Boenapalli, Hyderabad (IN); Vinod Kumar Kuruma, Jogulamba Gadwal (IN); Sai Praneeth Sreeram, Anantapur (IN); Ravindranath Doddi, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 241 days.

(21) Appl. No.: 18/338,070

(22) Filed: Jun. 20, 2023

(65) Prior Publication Data
US 2024/0427714 A1    Dec. 26, 2024

(51) Int. Cl.
G06F 13/16 (2006.01)

(52) U.S. Cl.
CPC .. *G06F 13/1673* (2013.01); *G06F 2213/0026* (2013.01)

(58) Field of Classification Search
CPC .......... G06F 13/1673; G06F 13/4282; G06F 2213/0026
See application file for complete search history.

(56) References Cited

U.S. PATENT DOCUMENTS

| | | | |
|---|---|---|---|
| 2007/0150762 A1* | 6/2007 | Sharma | G06F 1/3203 713/300 |
| 2009/0106476 A1* | 4/2009 | Jenkins | G06F 13/4221 710/315 |
| 2011/0173352 A1* | 7/2011 | Sela | G06F 1/3253 710/16 |
| 2019/0042510 A1* | 2/2019 | Ngau | G06F 13/4027 |
| 2021/0041929 A1* | 2/2021 | Connor | G06F 1/3209 |
| 2021/0042248 A1* | 2/2021 | Das Sharma | G06F 13/4282 |
| 2021/0409157 A1* | 12/2021 | Jauh | H04L 5/0055 |
| 2022/0116138 A1* | 4/2022 | Das Sharma | G06F 13/4027 |
| 2023/0171024 A1* | 6/2023 | Sun | H04L 1/1671 714/776 |
| 2024/0248645 A1* | 7/2024 | Ishiguro | G06F 3/0625 |

* cited by examiner

Primary Examiner — Phong H Dang

(74) Attorney, Agent, or Firm — Smith, Tempel, Blaha LLC

(57) ABSTRACT

A Peripheral Component Interconnect Express (PCIe) system and method achieve reduced latency and improved performance by reconfiguring the PCIe link to use an increased number of lanes for retransmitting data packets held in a replay buffer if one or more data packets transmitted by the TX device are flagged as not acknowledged (NACK) by the RX device. Before retransmitting the NACK-flagged packet(s), the link is reconfigured to use a greater number of lanes, preferably the maximum number of lanes that are available for use, and then the NACK-flagged packet(s) is retransmitted using the greater number of lanes until successful receipt of the NACK-flagged packets has been acknowledged by the RX device. Once the NACK-flagged packet(s) is successfully received by the RX device, the link is reconfigured to use the previous number of lanes and operations of the link resume using the previous number of lanes.

12 Claims, 6 Drawing Sheets

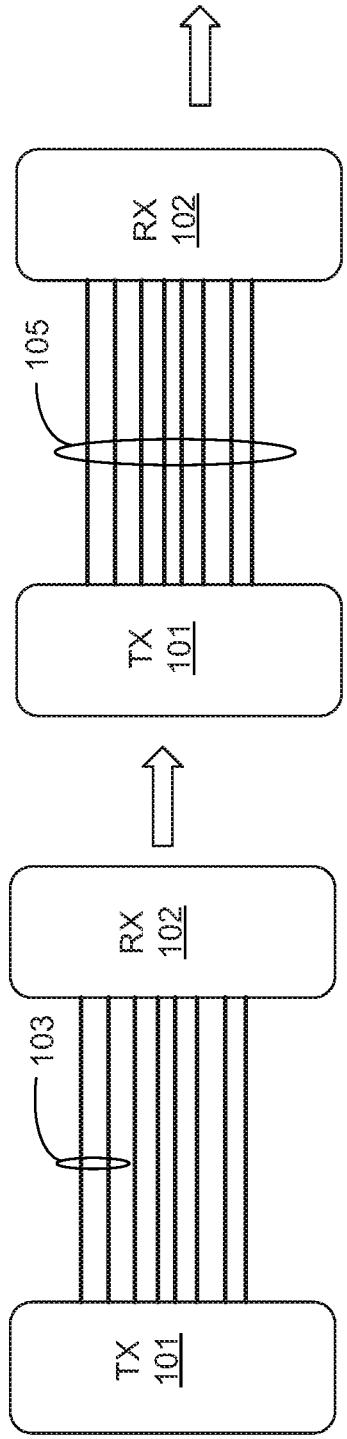
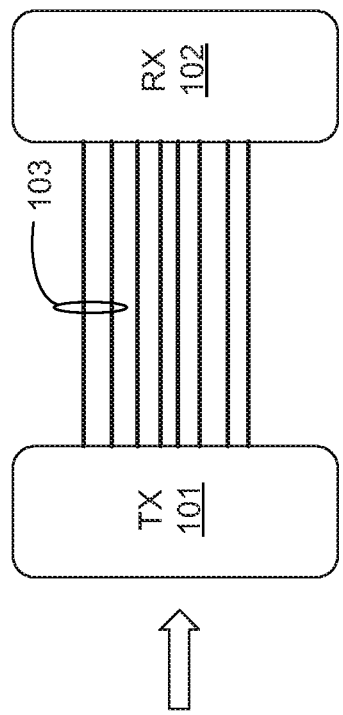
FIG. 1A
FIG. 1B
FIG. 1C

301

302

303

SYSTEMS AND METHODS FOR REDUCING LATENCY AND IMPROVING PERFORMANCE IN A PERIPHERAL COMPONENT INTERCONNECT EXPRESS (PCIe) SYSTEM

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, a portable digital assistant, a portable game console, etc. Still other types of PCDs may be included in automotive and Internet-of-Things ("IoT") applications.

Such processor-based subsystems may be included within the same integrated circuit chip or in different chips. A "system-on-a-chip", or "SoC", is an example of one such chip that integrates numerous subsystems to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Many of these subsystems communicate with one another using a standardized packet-based interface technology known as Peripheral Component Interface Express (PCIe). The PCIe 6.0 specification supports 128 Giga transfers per second (GT/s) over a PCIe bus. Components communicate bits in flow control units (FLITs) over one or more lanes of the PCIe bus at various link speeds. The link speeds and the number of lanes that are being used to communicate between the root complex (RC), or host, and the end point (EP) devices, or clients, can by changed by reconfiguring the link between the host and the clients.

In order to achieve scaling of power consumption with bandwidth usage, the PCIe 6.0 specification introduces a new power state called the "L0p" state. The L0p state is the recommended active functional state for FLIT mode of operations. In the L0p state, the configured number of lanes are set to be in the active state while all other lanes are kept in the electrically idle state.

In PCIe, a replay mechanism of the Data Link Layer (DLL) circuitry of the transmitting (TX) device is used to ensure that data is transferred correctly between the TX device and a receiving (RX) device. When a Transaction Layer (TL) packet (TLP) is sent from a TX device to an RX device, the TLP is divided into one or more FLITs, which are then transmitted over the PCIe link. A replay buffer of the replay mechanism holds a copy of every FLIT that has been sent until the FLIT is successfully received at the RX device.

Success of receipt of a FLIT by the RX device is determined based on whether the TX device receives an acknowledgement (ACK) from the RX device before a replay timer times out or the TX device receives a not acknowledged (NACK) from the RX device. If a FLIT is not acknowledged by the RX device before the replay timer times out, or if the TX device receives a NACK from the RX device, the same FLIT, which is held in the replay buffer until receipt success is achieved, will be retransmitted by the TX device.

If the TX device receives a NACK or the replay timer times out before the TX device receives an ACK, the TX device will retransmit the NACK-flagged FLIT(s) over the PCIe link using the current link configuration (link width and link speed). Assuming, for example, that the link is in the L0p state, that the maximum link width is ×8 lanes, and that the current link width is ×2 lanes, if the TX device receives a NACK, the corresponding NACK-flagged FLIT(s) is held in the replay buffer and is not retransmitted until the current FLITs are completed. The NACK-flagged FLIT(s) is then retransmitted over only ×2 lanes due to the current link configuration. In addition, until the NACK-flagged FLIT(s) are successfully retransmitted and acknowledged, the pending FLITs will occupy the replay buffer, blocking subsequent FLITs from the Transaction Layer from being transmitted.

SUMMARY OF THE DISCLOSURE

Systems, methods, and other examples are disclosed for reducing latency and improving performance in a PCIe system.

An exemplary embodiment of the method comprises:
with a TX device, using a first number of lanes of a PCIe link to transmit data packets over the PCIe link to an RX device, of which one or more of the transmitted data packets are held in a replay buffer of the TX device; and
with a processor of the TX device, determining whether or not said one or more transmitted data packets were successfully received by the RX device from the TX device, and if not, causing the TX device to use a second number of lanes of the PCIe link to retransmit said one or more transmitted data packets held in the replay buffer to the RX device, where the second number is greater than the first number.

An exemplary embodiment of the PCIe system comprises a PCIe link comprising lanes interconnecting a TX device with an RX device for transmitting data packets from the TX device to the RX device, a replay buffer configured to hold one or more of the transmitted data packets, and a processor of the TX device configured to determine whether or not one or more transmitted data packets were successfully received by the RX device from the TX device, and if not, to cause the TX device to use a second number of lanes of the PCIe link to retransmit said one or more transmitted data packets held in the replay buffer to the RX device, wherein the second number is greater than the first number.

An exemplary embodiment of a computer program for execution by a processor of a PCIe system comprises first and second sets of computer instructions embodied on a nontransitory computer-readable medium. The first set of computer instructions comprises instructions for causing the PCIe link to be configured to use a first number of lanes to transmit data packets over the PCIe link from the TX device to the RX device, where one or more of the transmitted data packets being held in a replay buffer of the TX device. The second set of computer instructions comprises instructions for determining whether or not said one or more transmitted data packets were successfully received by the RX device from the TX device, and if not, for causing the PCIe link to be configured to use a second number of lanes of the PCIe link to retransmit said one or more transmitted data packets held in the replay buffer from the TX device to the RX device, where the second number is greater than the first number.

These and other features and advantages will become apparent from the following description, drawings and claims.

BRIEF DESCRIPTION OF THE DRAWINGS

In the Figures, like reference numerals refer to like parts throughout the various views unless otherwise indicated.

FIGS. 1A-1C illustrate block diagrams of a PCIe link and demonstrate an example of the manner in which the link can be reconfigured to perform a retransmission of a NACK-flagged FLIT(s) in accordance with a representative embodiment.

DETAILED DESCRIPTION

Figure 2:
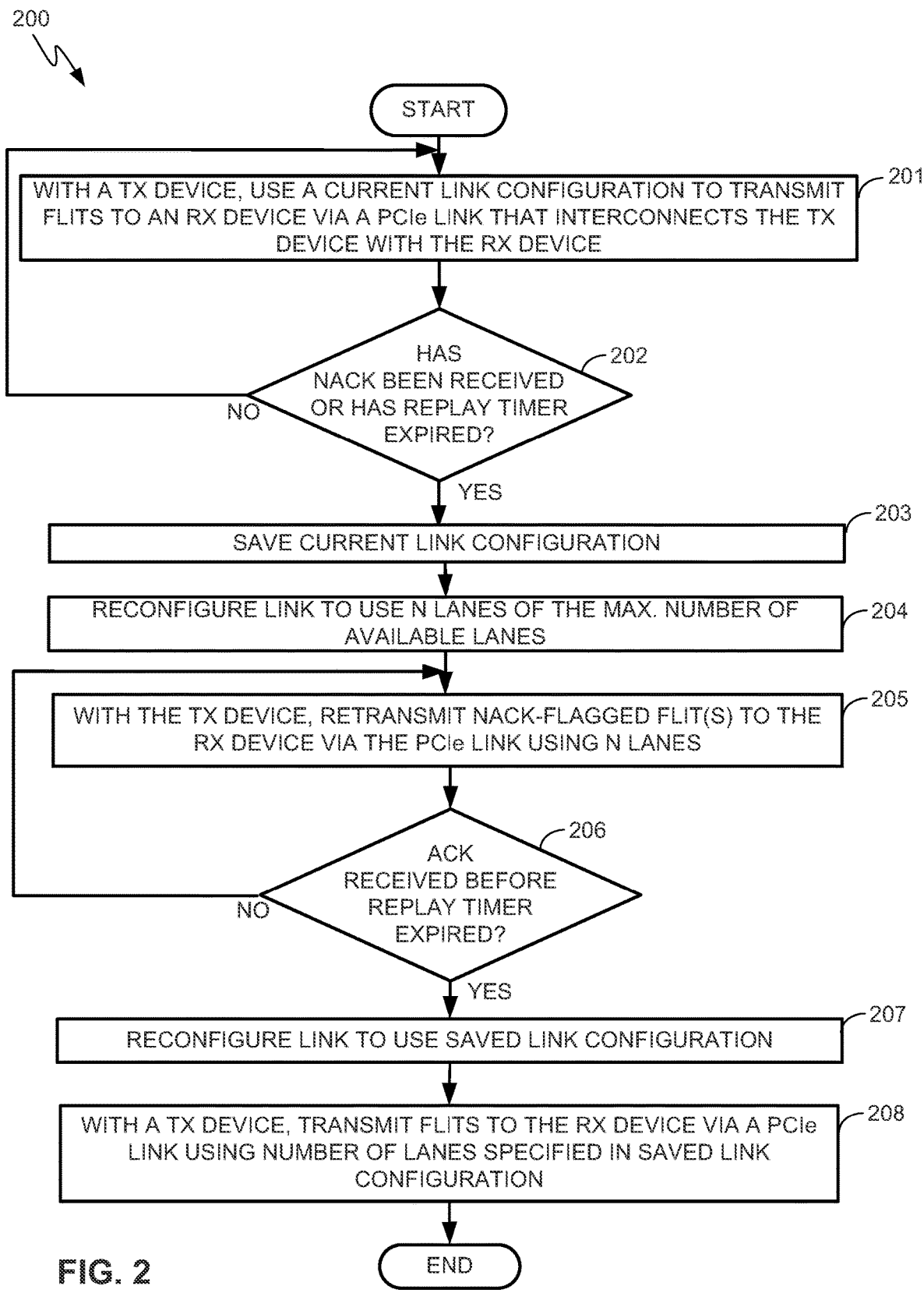
FIG. 2 illustrates a flow diagram of the PCIe method in accordance with a representative embodiment for reducing latency and improving performance.

The present disclosure discloses PCIe systems and methods for reducing latency and improving performance when transmitting and receiving data over a PCIe link. In accordance with a preferred embodiment, when one or more FLITs transmitted by the TX device are flagged as not acknowledged (NACK) as successfully received by the RX device, before retransmitting the NACK-flagged FLIT(s), the link is reconfigured to increase the link width, preferably to the maximum number of lanes that are available for use, and then the NACK-flagged FLIT(s) is retransmitted using the increased link width until the NACK-flagged FLIT(s) is acknowledged as successfully received by the RX device. The link is then reconfigured back to the previous number of lanes it was using prior to the FLIT(s) being flagged as not acknowledged. Operations of the link then resume using the previous number of lanes. Exemplary embodiments of the manner in which a PCIe system performs this process to reduce latency and improve performance are discussed below with reference to the figures.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein, encompasses an electronic component that is able to execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems. A processor may also refer to a combination of logic circuits that work together to perform a task or set of tasks.

A computing device may include multiple subsystems, cores or other components. Such a computing device may be, for example, a PCD, such as a laptop or palmtop computer, a cellular telephone or smartphone, a portable digital assistant, a portable game console, an automotive safety system, etc.

FIGS. 1A-1C illustrate a block diagram of a PCIe link and demonstrate an example of the manner in which the link is reconfigured to perform a retransmission of a NACK-flagged FLIT(s) in accordance with a representative embodiment. This example assumes that the TX device 101 is in the L0p state, that the TX device 101 is transmitting to the RX device 102 using an x2 lane configuration, and that the maximum number of lanes that are available for use is eight. As shown in FIG. 1A, with the current x2 link width configuration, two lanes 103 are currently active and being used to transmit data between the TX device 101 and the RX device 102 in the current L0p state.

When a transmitted FLIT(s) is tagged as a NACK FLIT (s), the link transitions from the L0p state to a recovery state and then to a configuration state in which the link is reconfigured to use eight lanes 105, as shown in FIG. 1B. The link then transitions from the configuration state back to the L0p state in which the NACK-flagged FLIT(s) is retransmitted using the eight lanes 105 until it is successfully received, as indicated by receipt of an ACK by the TX device 101. Once successful receipt of the NACK-flagged FLIT(s) has occurred, the link is reconfigured to the previous link configuration of two lanes 103, as shown in FIG. 1C, and resumes transmitting data.

FIG. 2 is a flow diagram of the PCIe method 200 in accordance with a representative embodiment for reducing latency and improving performance. Block 201 represents a TX device using a current link configuration to transmit FLITs to an RX device over a PCIe link. The current link configuration is typically a link configuration that has been negotiated between the TX device and the RX device. A determination is made at block 202 as to whether or not a NACK has been received or the replay timer has expired. If both are answered in the negative, the data transmission process represented by block 201 continues. If either is answered in the affirmative, the process proceeds to block 203 at which the current link configuration being used by the TX device at block 201 is saved in memory.

The process then proceeds to block 204 at which the link is reconfigured to use N of the currently available lanes, where N is a positive integer than is less than or equal to the maximum number of lanes that are currently available. N will typically be equal to the maximum number of lanes that are currently available, but in some cases it may be less than the total number of lanes currently available.

The process then proceeds to block 205 at which the TX device retransmits the NACK-flagged FLIT(s) using the new link configuration, as indicated by block 205. After the NACK-flagged FLIT(s) is retransmitted, a determination is made at block 206 as to whether or not an ACK has been received before the replay timer expired. If not, the process returns to block 205 and the NACK-flagged FLIT continues to be retransmitted until a determination is made at block 206 that the retransmitted FLIT has been successfully received by the RX device. The process then proceeds to block 207 at which the link is reconfigured to use the saved link configuration. The TX device then uses the saved link configuration to resume transmission of data, as indicated by block 208.

Figure 3:
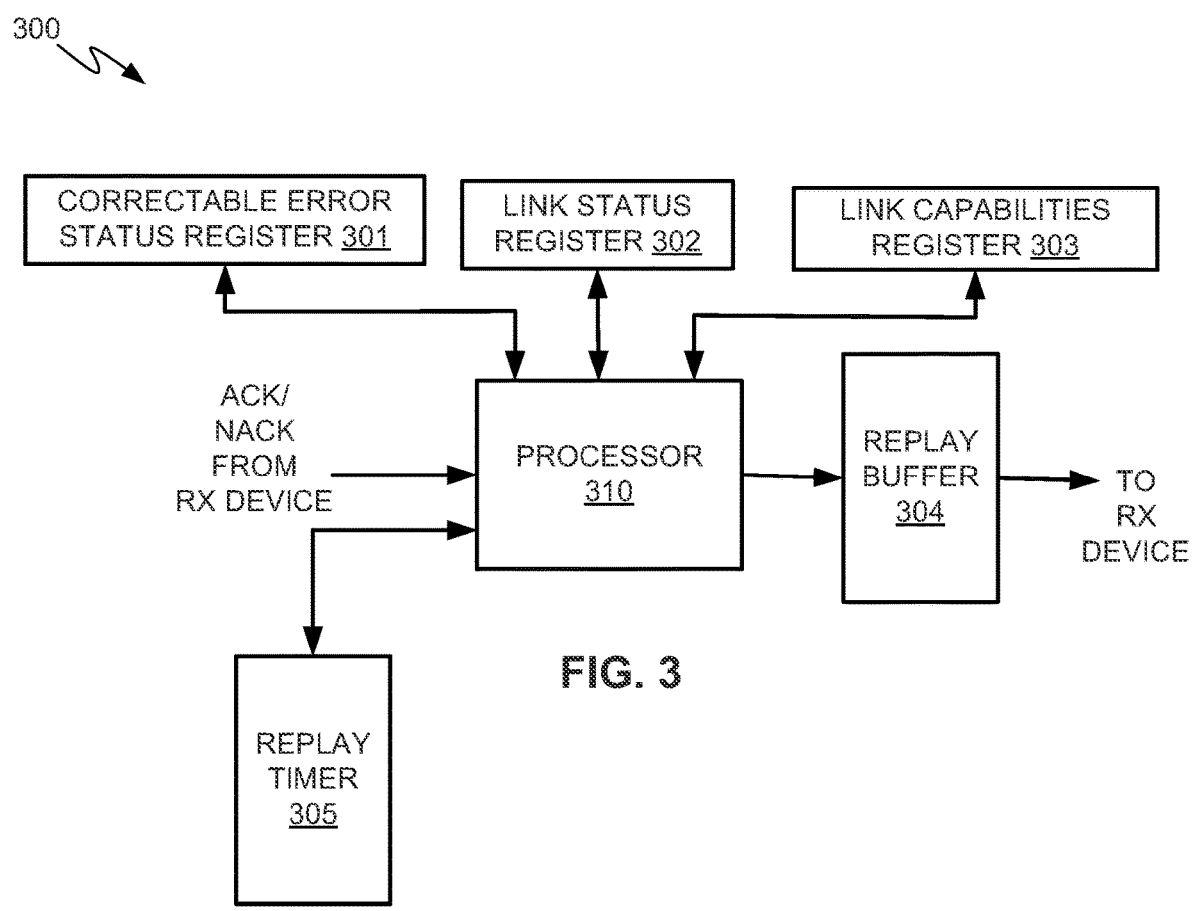
FIG. 3 illustrates a block diagram of the PCIe system in accordance with a representative embodiment.

FIG. 3 is a block diagram of the PCIe system 300 in accordance with a representative embodiment. In accordance with this embodiment, a processor 310 of the PCIe system 300 uses three different registers 301-303 to perform the method described above with reference to FIG. 2. However, it will be understood by those of skill in the art that the method can be implemented in a number of ways using various logic configurations. The processor 310 is a processor of a TX device and may be the RC host processor when it is operating as a TX device. The processor 310 may also be a processor of an EP device when it is operating as a TX device. The system 300 also includes the aforementioned replay buffer 304 and the aforementioned replay timer 305.

The processor 310 comprises logic configured to perform the tasks described above with reference to FIG. 2. In accordance with this embodiment, the processor 310 comprises logic configured to read bit values from the registers 301-303, update bit values of the registers 301-303, start and reset the replay timer 305, and control transmission and retransmission of the FLITs contained in the replay buffer 304 to the RX device.

Figure 4:
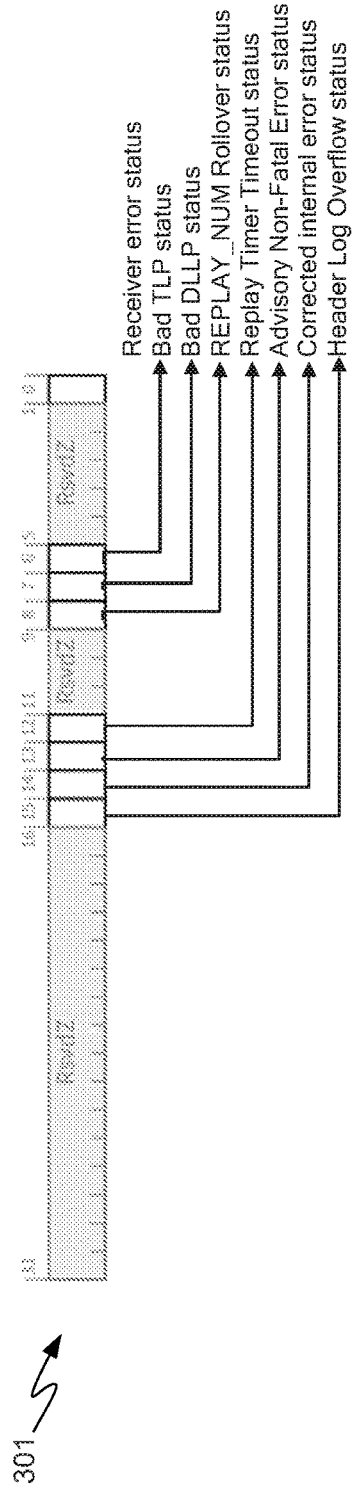
FIGS. 4-6 illustrate block diagrams of the registers 301-303, respectively, shown in FIG. 3.
Figure 5:
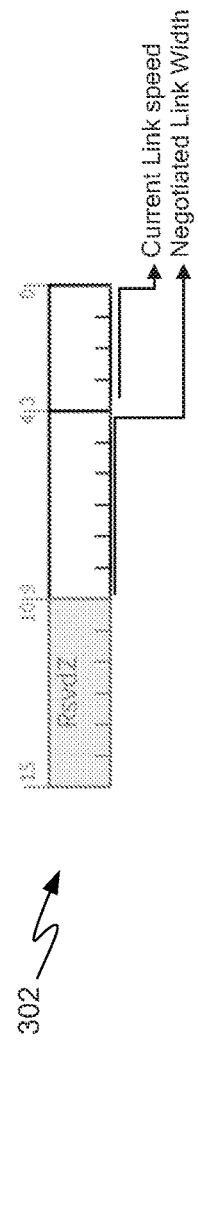
Figure 6:
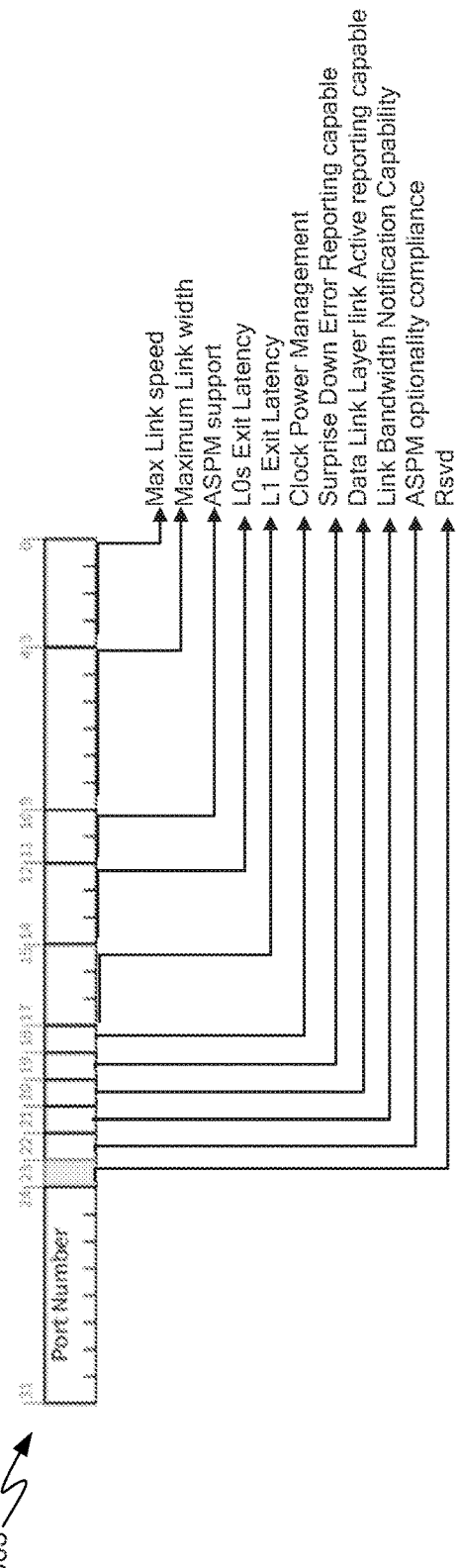

FIGS. 4-6 show the registers 301-303, respectively, and display definitions of the bit values stored at the respective bit positions of the registers 301-303. The PCIe system 300 and its operations will now be described with reference to FIGS. 2-6. In accordance with this embodiment, the step represented by block 202 (FIG. 2) is performed by the processor 310 (FIG. 3) checking the values of particular bits contained in the correctable error status (CES) register 301 (FIGS. 3 and 4). The current implementation of this register 301 has thirty-two bit positions, namely, bit positions 0 through 31. Bit positions 6 and 12 contain bit values for identifying a "Bad TLP Status" and a "Replay Timer Timeout Status", respectively. If the bit value in bit position 6 is asserted, this informs the processor 310 that a NACK was received by the TX device due to an error in receiving the FLIT(s) in the RX device. If the bit value in bit position 12 is asserted, this informs the processor 310 that the replay timer 305 has expired. Thus, if either of these bits is asserted, the processor 310 moves the process from block 202 to block 203. If neither of these bits is asserted, the process returns to block 201 and repeats that step before returning to block 202.

When the process moves to block 203, the RC host processor 310 saves the current link configuration being used. The current implementation of the link status register 302 is a sixteen-bit register having bit positions 0 through 15, as shown in FIG. 5. The bit values contained in bit positions 4 through 9 of register 302 correspond to the link width currently being used to transmit data. When the processor 310 moves to the step represented by block 203, the processor 310 reads the bit values at bit positions 4-9 of register 302 and saves them in bit positions 10-15 of the same register 302, which are reserved bit positions in the current implementation.

The processor 310 then moves to the step represented by block 204 of FIG. 2. With reference to FIG. 6, the current implementation of the link capabilities register 303 has thirty-two bit positions, namely bit positions 0 through 31. Currently, bit positions 4 through 9 contain bit values that identify the "Maximum Link Width". At the step represented by block 204 of FIG. 2, the processor 310 reconfigures the link to utilize the maximum number of lanes identified by the bit values in bit positions 4 though 9 of register 302 and then proceeds to the step represented by block 205 of FIG. 2 at which the NACK-flagged FLIT(s) is retransmitted and the replay timer 305 is reset. When the processor 310 reconfigures the link at step 204, it also saves the bit values contained in bit positions 4 through 9 of register 303 corresponding to the maximum link width in bit positions 4 through 9 of register 302. When the processor 310 moves to step 205, or as it finishes step 204, the processor 310 reads the bit values contained in bit positions 4 through 9 of register 302 to reconfigure the link to the maximum link width.

The process proceeds from the step represented by block 205 to the step represented by block 206 of FIG. 2 where it determines whether or not an ACK has been received before the replay timer 305 expired. The processor 310 performs this task by again evaluating the bit values at bit positions 6 and 12 of register 301. If either of these bit values is asserted, the processor 310 returns to the step represented by block 205 and continues to retransmit the NACK-flagged FLIT(s) using the maximum link width and reset the replay timer 305 until it determines at block 206 that both bit values have been deasserted, indicating that an ACK was received before the replay timer 305 expired.

Once a determination is made by the processor 310 at block 206 that the retransmitted FLIT(s) was successfully received, the processor 310 moves to the step represented by block 207 of FIG. 2, at which it reads the bit values at bit positions 10-15 of register 302 corresponding to the saved link width and reconfigures the link to the number of lanes specified by those bit values. This step includes storing those same bit values at bit positions 4 through 9 of register 302. The processor 310 then moves to the step represented by block 308 and resumes the normal data transmission mode of operations. This step includes reading bit values 4 through 9 of register 302 to reconfigure the link to use the link width identified by those bits, which is the same link width that was used for transmitting data at block 201.

As indicated above, the logical configurations and their operations described above with reference to FIGS. 2-6 are only an example of the manner in which logic can be configured to perform these tasks. Persons of skill in the art, will understand, in view of the description provided herein, that the inventive principles and concepts are not limited to embodiment represented by FIGS. 2-6 and that the processes represented by the flow diagram of FIG. 2 can be performed by many different logical configurations or circuits. For example, the processes performed by the processor 310 can be performed in hardware, software, firmware, or a combination thereof.

Figure 7:
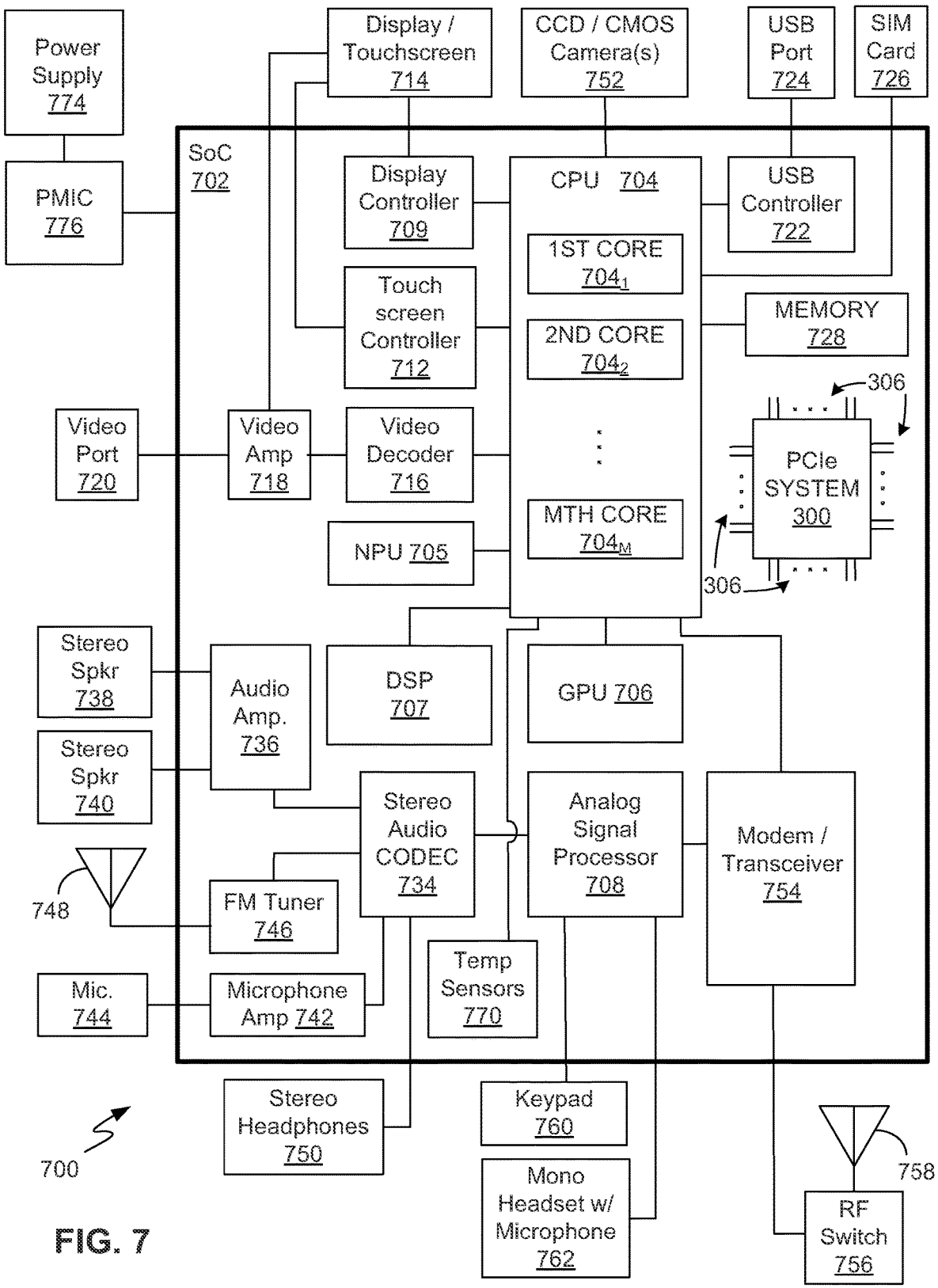
FIG. 7 illustrates an example of a PCD in which exemplary embodiments of systems, methods, computer-readable media, and other examples of the inventive principles and concepts of the present disclosure may be implemented.

FIG. 7 illustrates an example of a PCD 700, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of the inventive principles and concepts of the present disclosure may be implemented. The PCD 700 comprises an SoC 702, which comprises a PCIe system as described herein, such as the PCIe system 300 shown in FIG. 3, for example. For purposes of clarity, some interconnects, signals, etc., are not shown in FIG. 7. For example, the connections of the components of the SoC 702 to the PCIe bus 306 of the PCIe system 300 are not shown in FIG. 7.

The SoC 702 may include a CPU 704, an NPU 705, a GPU 706, a DSP 707, an analog signal processor 708, a modem/modem subsystem 754, or other processors. The CPU 704 may include one or more CPU cores, such as a first CPU core $704_1$, a second CPU core $704_2$, etc., through an $M^{th}$ CPU core $704_M$.

A display controller 709 and a touch-screen controller 712 may be coupled to the CPU 704. A touchscreen display 714 external to the SoC 702 may be coupled to the display controller 710 and the touch-screen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A universal serial bus ("USB") controller 722 may also be coupled to CPU 704, and a USB port 724 may be coupled to the USB controller 722. A subscriber identity module ("SIM") card 726 may also be coupled to the CPU 704.

One or more memories 728 may be coupled to the CPU 704. The one or more memories 728 may include both volatile and non-volatile memories. Examples of volatile memories include static random access memory ("SRAM") and dynamic random access memory ("DRAM"). Such memories may be external to the SoC 702 or internal to the SoC 702. The one or more memories 728 may include local cache memory or a system-level cache memory.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752.

A modem or RF transceiver 754 may be coupled to the analog signal processor 708 and the CPU 704. An RF switch 756 may be coupled to the RF transceiver 754 and an RF antenna 758. In addition, a keypad 760 and a mono headset with a microphone 762 may be coupled to the analog signal processor 708. The SoC 702 may have one or more internal or on-chip thermal sensors 770. A power supply 774 and a PMIC 776 may supply power to the SoC 702.

Firmware or software may be stored in any of the above-described memories, or may be stored in a local memory directly accessible by the processor hardware on which the software or firmware executes. Execution of such firmware or software by the PCIe system 300 may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Figure 8:
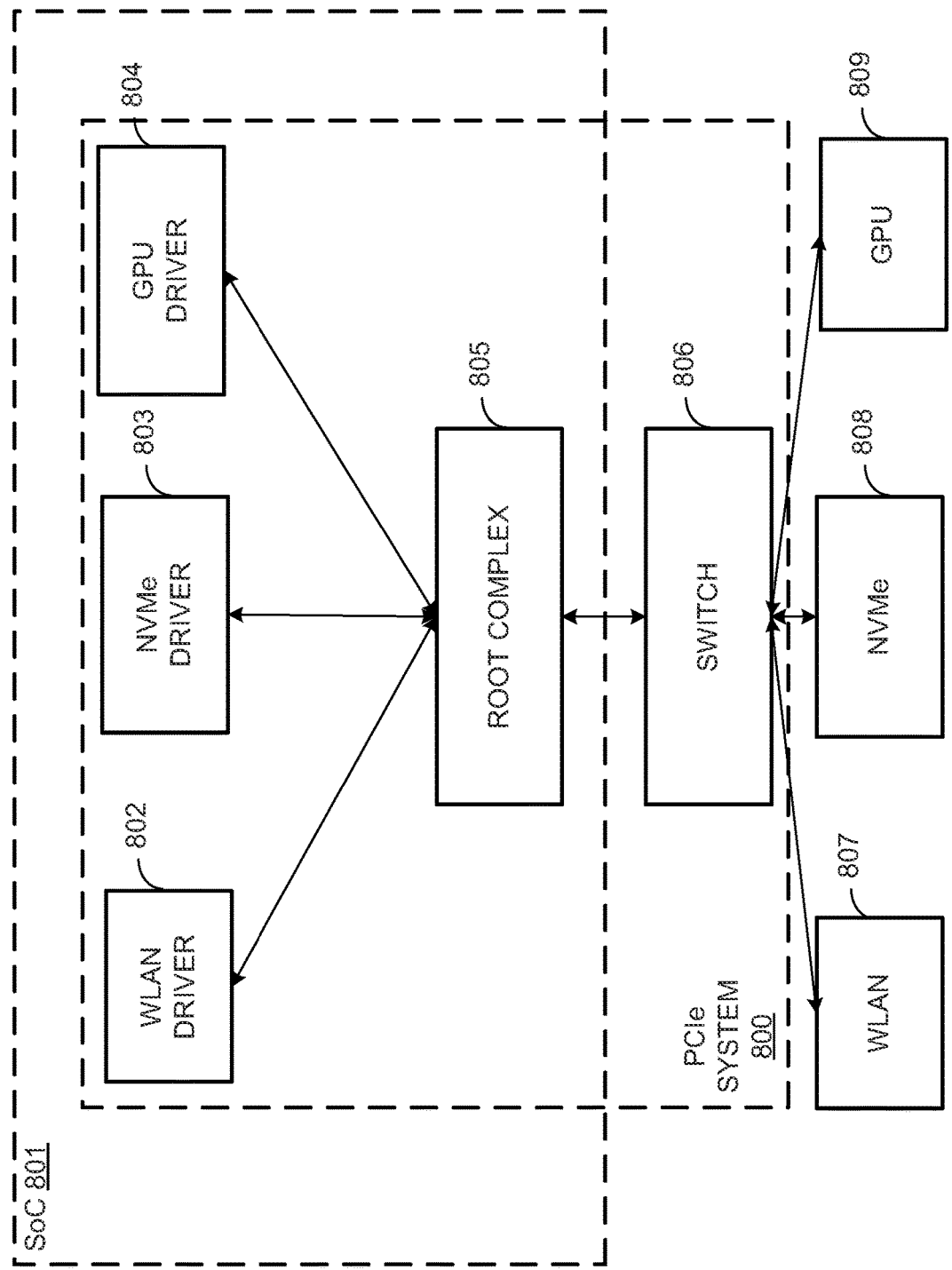
FIG. 8 illustrates a block diagram of the PCIe system in accordance with another exemplary embodiment in which drivers communicate with EP devices via an RC and a switch.

FIG. 8 illustrates a block diagram of the PCIe system 800 in accordance with another exemplary embodiment in which drivers 802-804 communicate with EP devices 807-809, respectively, via an RC 805 and a switch 806. In the exemplary embodiment shown in FIG. 8, the drivers 802-804 and the RC 805 are components of an SoC 801 and include a wireless local area network (WLAN) driver 802, a nonvolatile memory express (NVMe) driver 803 and a GPU driver 804. When any of the drivers 802-804 initiate a PCIe packet transfer, the RC 805, which typically comprises the host processor of the PCIe system 800, and the switch 806 operate together to perform the processes described above with reference to FIGS. 1A-6 to cause FLIT packet transfers to be made between the WLAN driver 802, the NVMe driver 803 and the GPU driver 804 and the WLAN 807, the NVMe 808 and the GPU 809, respectively, with reduced latency and improved performance.

Implementation examples are described in the following numbered clauses:

1. A method for reducing latency in a Peripheral Component Interconnect Express (PCIe) system, the method comprising:
   with a transmitter (TX) device, using a first number of lanes of a PCIe link to transmit data packets over the PCIe link to a receiver (RX) device, one or more of the transmitted data packets being held in a replay buffer of the TX device; and
   with a processor of the TX device, determining whether or not said one or more transmitted data packets were successfully received by the RX device from the TX device, and if not, causing the TX device to use a second number of lanes of the PCIe link to retransmit said one or more transmitted data packets held in the replay buffer to the RX device, wherein the second number is greater than the first number.

2. The method of clause 1, wherein the processor determines that said one or more transmitted data packets were not successfully received by the RX device from the TX device if the processor determines that a not acknowledged (NACK) indication associated with said one or more transmitted data packets was received by the TX device from the RX device or that a replay timer expired before an acknowledged (ACK) indication associated with said one or more transmitted data packets was received by the TX device from the RX device.

3. The method of clause 2, further comprising:
   with the processor, if the processor determines that the ACK indication was received by the TX device from the RX device before the replay timer expired, causing the TX device to continue transmitting data packets from the TX device to the RX device using the first number of lanes of the PCIe link.

4. The method of any of clauses 1-3, wherein the second number of lanes equals a maximum number of lanes of the link available for use by the TX device.

5. The method of any of clauses 2-4, further comprising: with the processor, if the processor determines that the NACK indication was received by the TX device from the RX device or that the replay timer expired before the ACK indication was received by the TX device, saving one or more bits identifying the first number of lanes in a memory device.

6. The method of clause 5, further comprising: with the processor, after saving said one or more bits identifying the first number of lanes in the memory device, reconfiguring the link to use the second number of lanes to retransmit said one or more transmitted data packets held in the replay buffer to the RX device and then causing the TX device to use the reconfigured link to retransmit said one or more transmitted data packets held in the replay buffer to the RX device using the second number of lanes.

7. The method of any of clauses 2-6, further comprising: with the processor, after retransmitting said one or more transmitted data packets held in the replay buffer to the RX device, resetting the replay timer and determining whether a NACK indication or an ACK indication associated with the retransmitted data packets was received by the TX device from the RX device before the reset replay timer expired.

8. The method of clause 7, further comprising: with the processor, if the processor determines that the NACK indication associated with the retransmitted data packets was received by the TX device or that the reset replay timer expired before the ACK indication associated with the retransmitted data packets was received by the TX device, causing the TX device to continue retransmitting the retransmitted data packets using the second number of lanes until the processor determines that an ACK indication associated with the retransmitted data packets has been received by the TX device from the RX device.

9. The method of any of clauses 5-8, further comprising: with the processor, after retransmitting said one or more transmitted data packets held in the replay buffer to the RX device and determining that an ACK indication associated with the retransmitted data packets has been received by the TX device from the RX device, reading said one or more bits from the memory, reconfiguring the link to use the first number of lanes identified by said one or more bits, and causing the TX device to transmit data packets from the TX device to the RX device using the first number of lanes.

10. The method of any of clauses 1-9, further comprising: with the processor, prior to causing the TX device to use the second number of lanes of the PCIe link to retransmit said one or more transmitted data packets held in the replay buffer to the RX device, determining the second number of lanes to be used to retransmit said one or more transmitted data packets by reading one or more bit values from memory that identify the second number of lanes.

11. A Peripheral Component Interconnect Express (PCIe) system having reduced latency, the PCIe system comprising:
a PCIe link comprising lanes for interconnecting a transmitter (TX) device with a receiver (RX) device for transmitting data packets from the TX device to the RX device;
a replay buffer of the TX device, the replay buffer being configured to hold one or more of the transmitted data packets; and
a processor of the TX device configured to determine whether or not one or more transmitted data packets were successfully received by the RX device from the TX device, and if not, to cause the TX device to use a second number of lanes of the PCIe link to retransmit said one or more transmitted data packets held in the replay buffer to the RX device, wherein the second number is greater than the first number.

12. The PCIe system of clause 11, further comprising: a replay timer, and wherein the processor is configured to determine that said one or more transmitted data packets were not successfully received by the TX device from the RX device if the processor determines that a not acknowledged (NACK) indication associated with said one or more transmitted data packets was received by the TX device from the RX device or that a replay timer expired before an acknowledged (ACK) indication associated with said one or more transmitted data packets was received by the TX device from the RX device.

13. The PCIe system of any of clauses 11-12, wherein the processor is configured to cause the TX device to continue transmitting data packets from the TX device to the RX device using the first number of lanes of the PCIe link if the processor determines that the ACK indication was received by the TX device from the RX device before the replay timer expired.

14. The PCIe system of any of clauses 11-13, wherein the second number of lanes equals a maximum number of lanes of the link available for use by the TX device.

15. The PCIe system of any of clauses 12-14, further comprising:
one or more memory devices, wherein the processor is configured to save one or more bits identifying the first number of lanes in said one or more memory devices if the processor determines that the NACK indication was received by the TX device from the RX device or that the replay timer expired before an ACK indication was received by the TX device from the RX device.

16. The PCIe system of clause 15, wherein the processor is configured to reconfigure the link to use the second number of lanes and to cause said one or more transmitted data packets held in the replay buffer to be retransmitted to the RX device after saving said one or more bits identifying the first number of lanes in said one or more memory devices.

17. The PCIe system of any of clauses 12-16, wherein the processor is configured to reset the replay timer after retransmitting said one or more transmitted data packets held in the replay buffer to the RX device and to determine whether a NACK indication associated with the retransmitted data packets was received by the TX device or an ACK indication associated with the retransmitted data packets was received by the TX device from the RX device before the reset replay timer expired.

18. The PCIe system of clause 17, wherein the processor is configured to cause the TX device to continue retransmitting the retransmitted data packets using the second number of lanes and resetting the replay timer until the processor determines that an ACK indication associated with the retransmitted data packets has been received by the TX device from the RX device before the reset replay timer expired.

19. The PCIe system of any of clauses 15-18, wherein the processor is configured to read said one or more bits from said one or more memory devices, to reconfigure the link to use the first number of lanes identified by the one or more bits, and to cause the TX device to transmit data packets from the TX device to the RX device using the first number of lanes if the processor determines that an ACK indication associated with the retransmitted data packets has been received by the TX device from the RX device.

20. A computer program for execution by a processor of a Peripheral Component Interconnect Express (PCIe) system for reducing latency when transmitting data packets between a transmitter (TX) device and a receiver (RX) device over a PCIe link of the PCIe system, the computer program being embodied on a nontransitory computer-readable medium and comprising:
  a first set of computer instructions for causing the PCIe link to be configured to use a first number of lanes to transmit data packets over the PCIe link from the TX device to the RX device, one or more of the transmitted data packets being held in a replay buffer of the TX device; and
  a second set of computer instruction for determining whether or not said one or more transmitted data packets were successfully received by the RX device from the TX device, and if not, for causing the PCIe link to be configured to use a second number of lanes of the PCIe link to retransmit said one or more transmitted data packets held in the replay buffer from the TX device to the RX device, wherein the second number is greater than the first number.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for reducing latency in a Peripheral Component Interconnect Express (PCIe) system, the method comprising:
  with a transmitter (TX) device, using a first number of lanes of a PCIe link to transmit data packets over the PCIe link to a receiver (RX) device, one or more of the transmitted data packets being held in a replay buffer of the TX device;
  with a processor of the TX device, determining whether or not said one or more transmitted data packets were successfully received by the RX device from the TX device, and if not, causing the TX device to use a second number of lanes of the PCIe link to retransmit said one or more transmitted data packets held in the replay buffer to the RX device, wherein the second number of lanes is greater than the first number and the second number of lanes equals a maximum number of lanes of the link available for use by the TX device;
  with a processor of the TX device, determining whether said one or more transmitted data packets were not successfully received by the RX device from the TX device if the processor determines that a not acknowledged (NACK) indication associated with said one or more transmitted data packets was received by the TX device from the RX device or that a replay timer expired before an acknowledged (ACK) indication associated with said one or more transmitted data packets was received by the TX device from the RX device;
  with the processor, if the processor determines that the ACK indication was received by the TX device from the RX device before the replay timer expired, causing the TX device to continue transmitting data packets from the TX device to the RX device using the first number of lanes of the PCIe link; and
  with the processor, if the processor determines that the NACK indication was received by the TX device from the RX device or that the replay timer expired before the ACK indication was received by the TX device, saving one or more bits identifying the first number of lanes in a memory device.

2. The method of claim 1, further comprising:
  with the processor, after saving said one or more bits identifying the first number of lanes in the memory device, reconfiguring the link to use the second number of lanes to retransmit said one or more transmitted data packets held in the replay buffer to the RX device and then causing the TX device to use the reconfigured link to retransmit said one or more transmitted data packets held in the replay buffer to the RX device using the second number of lanes.

3. The method of claim 2, further comprising:
  with the processor, after retransmitting said one or more transmitted data packets held in the replay buffer to the RX device, resetting the replay timer and determining whether a NACK indication or an ACK indication associated with the retransmitted data packets was received by the TX device from the RX device before the reset replay timer expired.

4. The method of claim 3, further comprising:
  with the processor, if the processor determines that the NACK indication associated with the retransmitted data packets was received by the TX device or that the reset replay timer expired before the ACK indication associated with the retransmitted data packets was received by the TX device, causing the TX device to continue retransmitting the retransmitted data packets using the second number of lanes until the processor determines that an ACK indication associated with the retransmitted data packets has been received by the TX device from the RX device.

5. The method of claim 3, further comprising:
  with the processor, after retransmitting said one or more transmitted data packets held in the replay buffer to the RX device and determining that an ACK indication associated with the retransmitted data packets has been received by the TX device from the RX device, reading said one or more bits from the memory, reconfiguring the link to use the first number of lanes identified by said one or more bits, and causing the TX device to transmit data packets from the TX device to the RX device using the first number of lanes.

6. The method of claim 3, further comprising:
  with the processor, prior to causing the TX device to use the second number of lanes of the PCIe link to retransmit said one or more transmitted data packets held in the replay buffer to the RX device, determining the second number of lanes to be used to retransmit said one or more transmitted data packets by reading one or more bit values from memory that identify the second number of lanes.

7. A Peripheral Component Interconnect Express (PCIe) system having reduced latency, the PCIe system comprising:

a PCIe link comprising lanes for interconnecting a transmitter (TX) device with a receiver (RX) device for transmitting data packets from the TX device to the RX device;

a replay buffer of the TX device, the replay buffer being configured to hold one or more of the transmitted data packets;

a processor of the TX device configured to determine whether or not one or more transmitted data packets were successfully received by the RX device from the TX device, and if not, to cause the TX device to use a second number of lanes of the PCIe link to retransmit said one or more transmitted data packets held in the replay buffer to the RX device, wherein the second number of lanes is greater than the first number and the second number of lanes equals a maximum number of lanes of the link available for use by the TX device;

a replay timer, wherein the processor is configured to determine that said one or more transmitted data packets were not successfully received by the TX device from the RX device if the processor determines that a not acknowledged (NACK) indication associated with said one or more transmitted data packets was received by the TX device from the RX device or that the replay timer expired before an acknowledged (ACK) indication associated with said one or more transmitted data packets was received by the TX device from the RX device;

the processor is configured to cause the TX device to continue transmitting data packets from the TX device to the RX device using the first number of lanes of the PCIe link if the processor determines that the ACK indication was received by the TX device from the RX device before the replay timer expired; and one or more memory devices, wherein the processor is configured to save one or more bits identifying the first number of lanes in said one or more memory devices if the processor determines that the NACK indication was received by the TX device from the RX device or that the replay timer expired before an ACK indication was received by the TX device from the RX device.

8. The PCIe system of claim 7, wherein the processor is configured to reconfigure the link to use the second number of lanes and to cause said one or more transmitted data packets held in the replay buffer to be retransmitted to the RX device after saving said one or more bits identifying the first number of lanes in said one or more memory devices.

9. The PCIe system of claim 8, wherein the processor is configured to reset the replay timer after retransmitting said one or more transmitted data packets held in the replay buffer to the RX device and to determine whether a NACK indication associated with the retransmitted data packets was received by the TX device or an ACK indication associated with the retransmitted data packets was received by the TX device from the RX device before the reset replay timer expired.

10. The PCIe system of claim 9, wherein the processor is configured to cause the TX device to continue retransmitting the retransmitted data packets using the second number of lanes and resetting the replay timer until the processor determines that an ACK indication associated with the retransmitted data packets has been received by the TX device from the RX device before the reset replay timer expired.

11. The PCIe system of claim 9, wherein the processor is configured to read said one or more bits from said one or more memory devices, to reconfigure the link to use the first number of lanes identified by the one or more bits, and to cause the TX device to transmit data packets from the TX device to the RX device using the first number of lanes if the processor determines that an ACK indication associated with the retransmitted data packets has been received by the TX device from the RX device.

12. A computer program for execution by a processor of a Peripheral Component Interconnect Express (PCIe) system for reducing latency when transmitting data packets between a transmitter (TX) device and a receiver (RX) device over a PCIe link of the PCIe system, the computer program being embodied on a nontransitory computer-readable medium and comprising:

a first set of computer instructions for causing the PCIe link to be configured to use a first number of lanes to transmit data packets over the PCIe link from the TX device to the RX device, one or more of the transmitted data packets being held in a replay buffer of the TX device;

a second set of computer instructions for determining whether or not said one or more transmitted data packets were successfully received by the RX device from the TX device, and if not, for causing the PCIe link to be configured to use a second number of lanes of the PCIe link to retransmit said one or more transmitted data packets held in the replay buffer from the TX device to the RX device, wherein the second number of lanes is greater than the first number and the second number of lanes equals a maximum number of lanes of the link available for use by the TX device;

a third set of computer instructions for determining whether said one or more transmitted data packets were not successfully received by the RX device from the TX device if the processor determines that a not acknowledged (NACK) indication associated with said one or more transmitted data packets was received by the TX device from the RX device or that a replay timer expired before an acknowledged (ACK) indication associated with said one or more transmitted data packets was received by the TX device from the RX device;

a fourth set of computer instructions for determining if the ACK indication was received by the TX device from the RX device before the replay timer expired, causing the TX device to continue transmitting data packets from the TX device to the RX device using the first number of lanes of the PCIe link; and a fifth set of computer instructions for determining if the NACK indication was received by the TX device from the RX device or that the replay timer expired before the ACK indication was received by the TX device, saving one or more bits identifying the first number of lanes in a memory device.

* * * * *